United States Patent
Pattison et al.

[11] Patent Number: 6,095,729
[45] Date of Patent: Aug. 1, 2000

[54] SPINDLE EXTENSION FOR MILLING MACHINE

[75] Inventors: James P. Pattison, West Chester, Ohio; Sukhminder S. Grewal, New Haven, Conn.; Douglas R. Smith, Hamilton, Ohio

[73] Assignee: General Electric Company, Cincinnati, Ohio

[21] Appl. No.: 09/207,953

[22] Filed: Dec. 9, 1998

[51] Int. Cl.⁷ .............................. B23C 5/26; B23B 29/00
[52] U.S. Cl. .................... 409/230; 409/144; 409/231; 409/232
[58] Field of Search .................... 409/230, 231, 409/232, 233, 144; 408/238, 239 A, 239 R

[56] References Cited

U.S. PATENT DOCUMENTS

| | | | |
|---|---|---|---|
| 2,915,549 | 12/1959 | Novkov | 409/144 X |
| 3,164,063 | 1/1965 | Sherman | 90/17 |
| 4,548,532 | 10/1985 | Watanabe et al. | 409/233 |
| 4,557,645 | 12/1985 | Marsland | 409/144 |
| 4,815,903 | 3/1989 | Skidmore, Sr. | 409/131 |
| 5,027,682 | 7/1991 | Aiso et al. | 82/142 |
| 5,033,921 | 7/1991 | Tasuhara et al. | 409/232 X |
| 5,322,494 | 6/1994 | Hotley et al. | 408/239 R X |
| 5,342,155 | 8/1994 | Harroun | 409/144 |
| 5,632,580 | 5/1997 | Dube et al. | 409/230 |

FOREIGN PATENT DOCUMENTS

| | | | |
|---|---|---|---|
| 20832 | 2/1985 | Japan | 409/233 |
| 62-120956 | 6/1987 | Japan | 409/230 |
| 62-251037 | 10/1987 | Japan | 409/233 |
| 645778 | 2/1979 | U.S.S.R. | 409/144 |
| 1181784 | 9/1985 | U.S.S.R. | 409/233 |

*Primary Examiner*—William Briggs
*Attorney, Agent, or Firm*—Andrew C. Hess; Gerry S. Gressel

[57] ABSTRACT

Tool extension and stability in milling machines is enhanced by providing a spindle extension having a housing attached to the mill head and an arbor rotatively mounted in a bore formed in the housing. The arbor, which is significantly longer than conventional arbors, is supported by first and second bearing assemblies and includes a substantially cylindrical body portion with an integral shank formed on one end thereof for connecting the arbor to a machine tool spindle. A cutting tool is attached to the other end of the arbor.

13 Claims, 4 Drawing Sheets

SPINDLE EXTENSION FOR MILLING MACHINE

BACKGROUND OF THE INVENTION

This invention relates generally to spindle extensions for milling machines and more particularly to a spindle extension having a supported arbor.

Milling machines are well known devices used for a wide variety of machining operations. A typical milling machine includes a mill head provided with a spindle that rotates with respect to the mill head. A cutting tool is attached to the spindle to perform work on a workpiece. A common prior art approach for fitting the tool to the spindle includes inserting a tapered shank of the tool into a tapered hole formed in the spindle. A retention knob provided on the shank is grasped by the milling machine's conventional draw bar assembly, which pulls the shank into the spindle to firmly attach the tool to the spindle. One problem with this arrangement is that standard cutting tools are too short to accommodate deep cavities required in some workpieces. While spindle extensions are available, these typically provide relatively limited extensions in the reach of the milling machine.

One known spindle extension comprises an arbor provided on one end with a tapered shank sized to fit the tapered hole of a standard milling machine spindle. The tapered shank is received in the tapered hole in order to connect the arbor for rotation with the spindle in the same manner that a cutting tool is conventionally connected to the spindle. The cutting tool is then attached to the end of the arbor opposite the spindle and is thus displaced from the spindle a distance equal to the length of the arbor. However, with this type of spindle extension, the arbor is not supported in any way other than by the tapered shank spindle connection. This results in a cantilevered arrangement that is susceptible to excessive flexure. Accordingly, such conventional spindle extensions are limited to arbor lengths of about six inches, and such extensions do not function well in high speed, heavy cutting machining operations. At greater lengths, the arbor and/or the tool tend to experience instability that can result in lack of dimensional control, poor surface finish and tool failure.

Accordingly, there is a need for a milling machine spindle extension that provides considerably greater tool reach in high speed milling machines in a stable manner.

SUMMARY OF THE INVENTION

The above-mentioned needs are met by the present invention which provides a milling machine spindle extension having a housing attached to the mill head and an arbor rotatively mounted in a bore formed in the housing. The arbor, which is significantly longer than conventional arbors, is supported by first and second bearing assemblies and includes a substantially cylindrical body portion with an integral shank formed on one end thereof for connecting the arbor to a machine tool spindle. The other end of the arbor includes a means for attaching a cutting tool.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
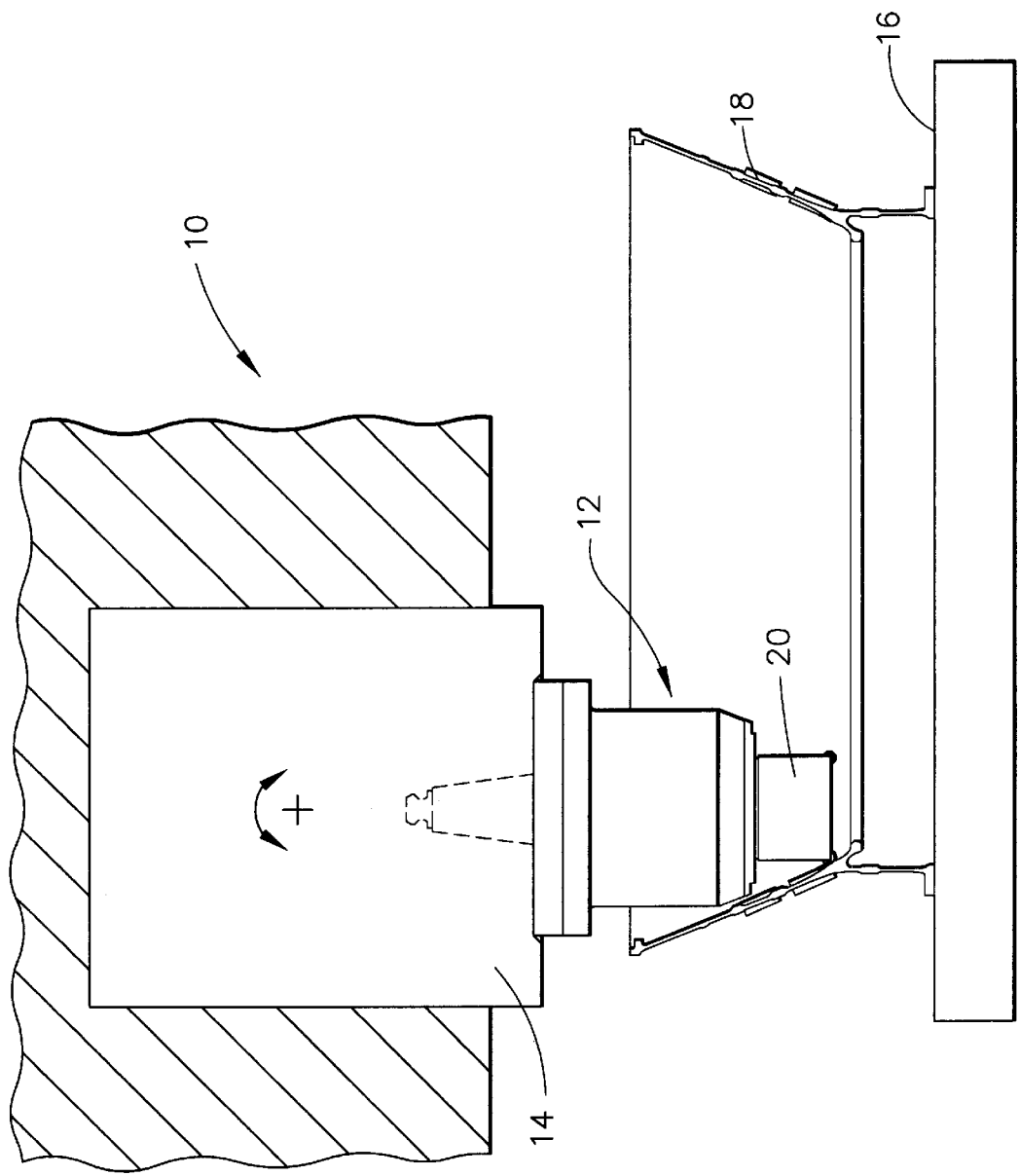
FIG. 1 is a partial side view of a milling machine having the spindle extension of the present invention.

Referring to the drawings wherein identical reference numerals denote the same elements throughout the various views, FIG. 1 shows a portion of a milling machine 10 having a spindle extension 12 of the present invention. Milling machine 10 includes a mill head 14 moveable about and along multiple axes and a mill table 16 for supporting a workpiece 18 to be worked on. Spindle extension 12 is attached to mill head 14 and carries a cutting tool 20 for machining within a deep cavity formed by workpiece 18.

Figure 2:
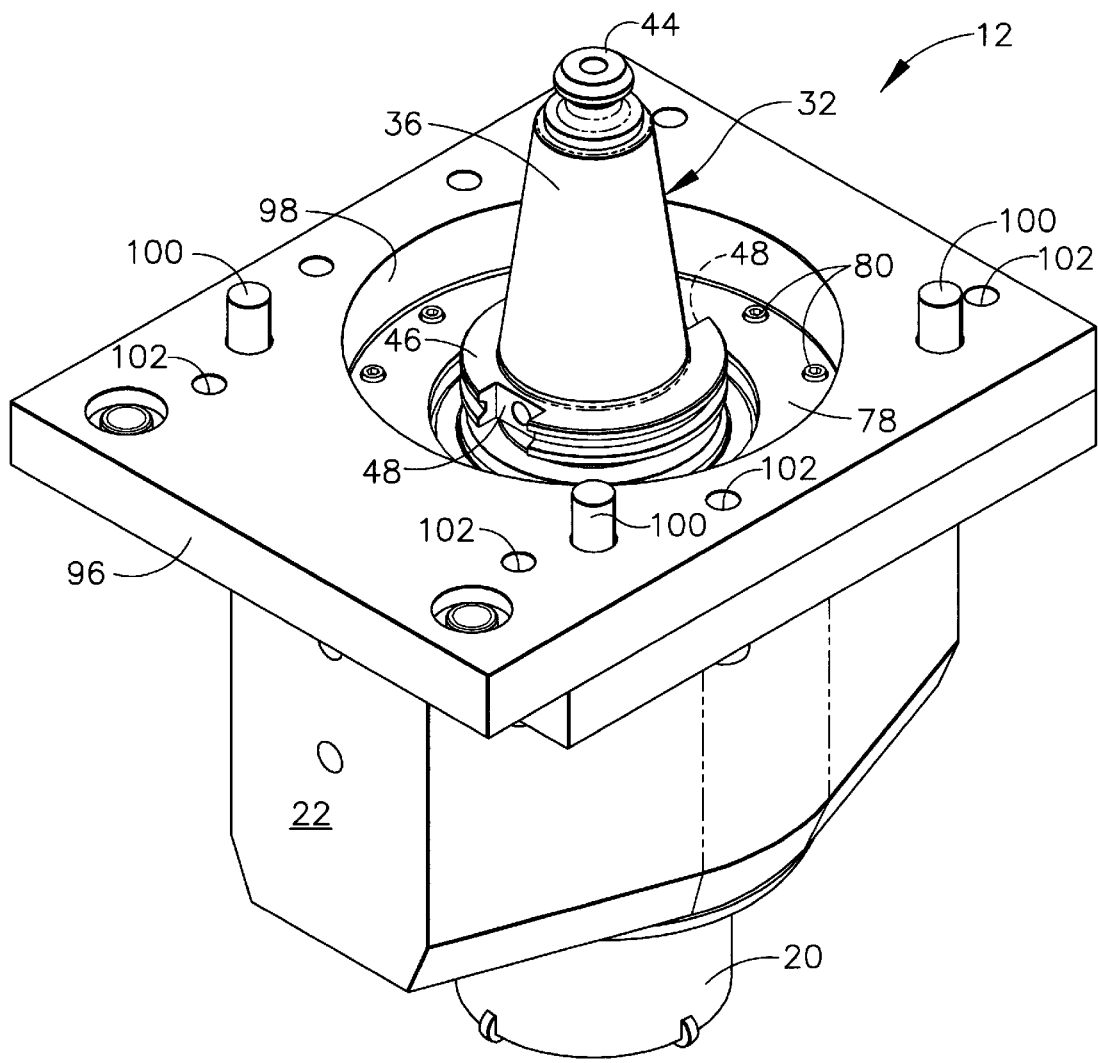
FIG. 2 is a perspective view of the spindle extension of the present invention.
Figure 3:
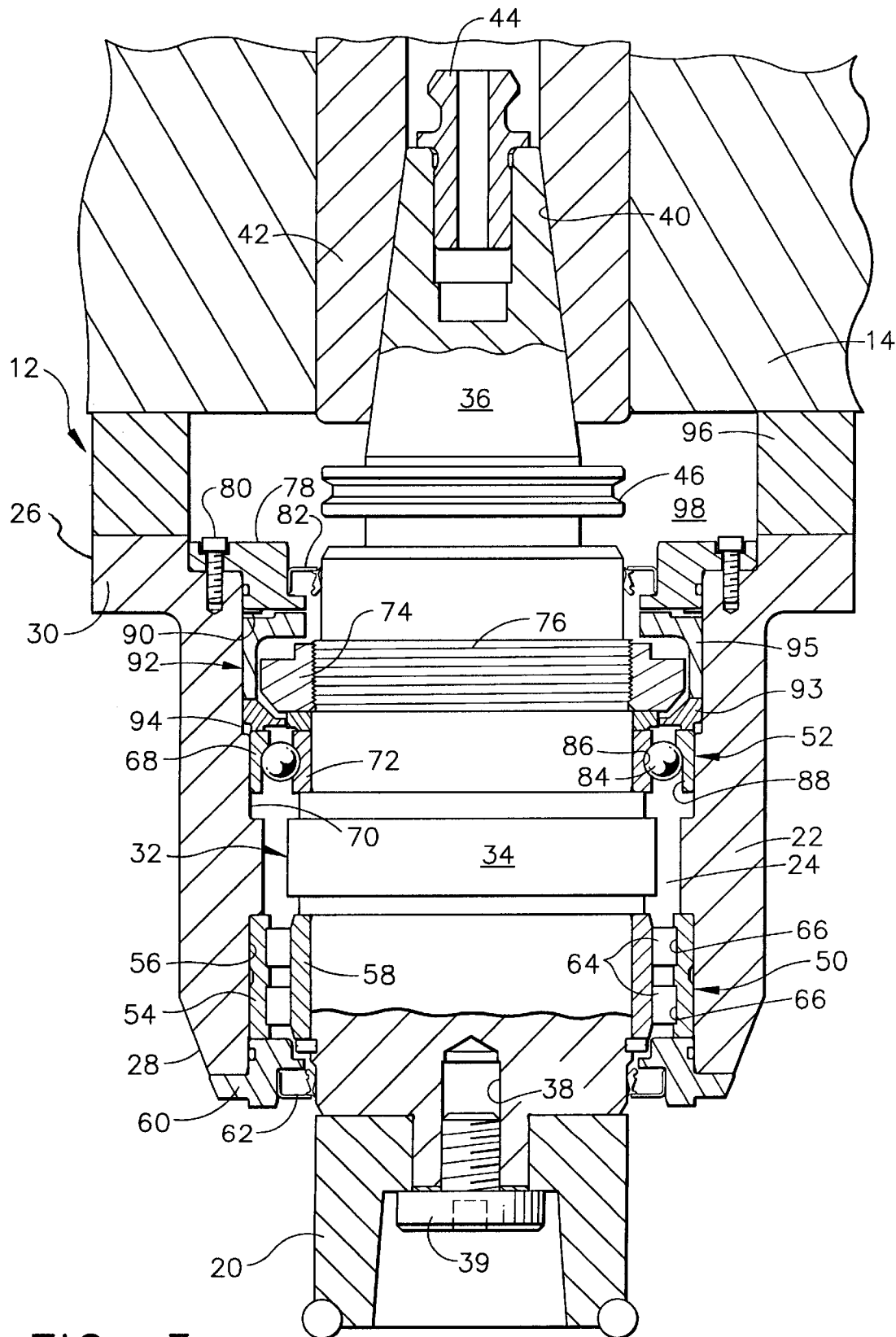
FIG. 3 is a sectional view of the spindle extension of FIG. 2.
Figure 4:
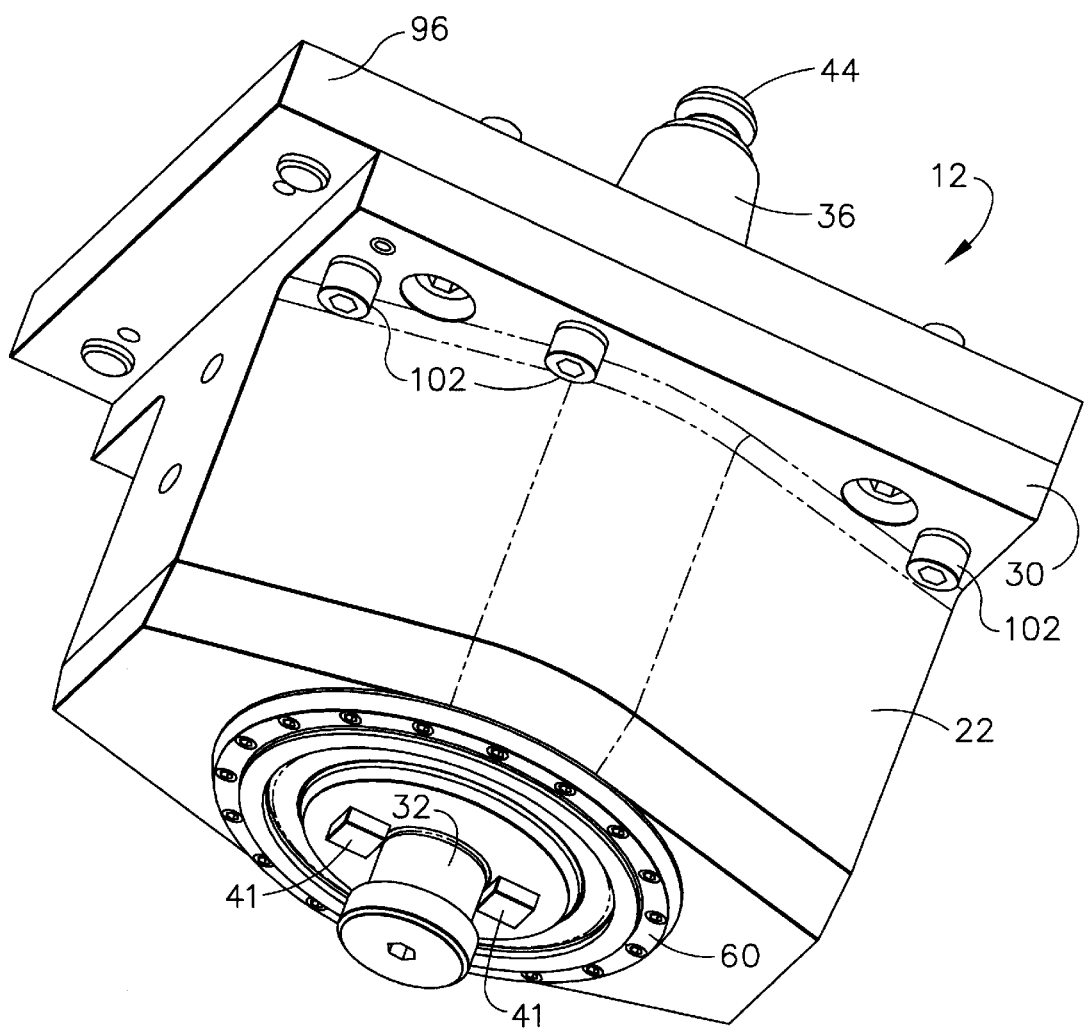
FIG. 4 is another perspective view of the spindle extension of the present invention.

Turning now to FIGS. 2–4, spindle extension 12 is shown in greater detail. Spindle extension 12 includes a stationary housing 22 that is fixedly attached to mill head 14. A substantially cylindrical bore 24 (FIG. 3) is formed through housing 22. Bore 24 extends from the proximal end 26 of housing 22 to the distal end 28 of housing 22. A mounting flange 30 is formed on proximal end 26 for attaching housing 22 to mill head 14 in a manner that will be subsequently described.

An arbor 32 is mounted in bore 24 for rotation about its longitudinal axis. Arbor 32 includes a substantially cylindrical body portion 34 having a shank 36 integrally formed on one end and a threaded hole 38 formed in the other end. Threaded hole 38 is coaxial with the longitudinal axis of arbor 32 and, together with a screw 39, provides a means for attaching cutting tool 20 to spindle extension 12. As best shown in FIG. 4, a pair of drive lugs 41 is attached to arbor 32 adjacent to threaded hole 38. Drive lugs 41 are received in notches (not shown) formed in cutting tool 20 so as to prevent rotation of tool 20 with respect to arbor 32 during cutting operations. Shank 36 is adapted to be received within a hole 40 of the milling machine spindle 42 (FIG. 3) rotatively mounted in mill head 14. Shank 36 and hole 40 are preferably, although not necessarily, tapered. A retention knob 44 is affixed to the end of tapered shank 36 and grasped by the milling machine power draw bar apparatus (not shown) such that tapered shank 36, and hence arbor 32, is pulled into firm engagement with spindle 42. A drive flange 46 is formed on arbor 32 at the base of tapered shank 36. As seen in FIG. 2, drive flange 46 has a pair of notches 48 formed therein for receiving projections (not shown) formed on the lower end of spindle 42 so as to positively transmit the rotation of spindle 42 to arbor 32.

Referring to FIG. 3, it is seen that arbor 32 is rotatively supported in bore 24 by a first, or distal, bearing assembly 50 and a second, or proximal, bearing assembly 52. First bearing assembly 50, located adjacent to distal end 28 of housing 22, includes an outer ring-shaped race 54 disposed in a first annular recess 56 formed in bore 24 and an inner ring-shaped race 58 fixed to the outer surface of arbor 32. A first cap ring 60 is attached to distal end 28 of housing 22 so as to encircle arbor 32 and close off the open end of bore 24 and retain outer race 54 in recess 56. Cap ring 60 supports a first shaft seal 62 which slidingly engages arbor 32 to seal the interior of housing 22 from influx of machining debris. One or more sets of circumferentially spaced rollers 64 are disposed between outer and inner races 54 and 58 with their individual longitudinal axes arranged parallel with the longitudinal axis of arbor 32. Preferably, at least two sets of rollers 64, as shown in FIG. 3, are provided. It should be noted however, that when using two or more sets, rollers 64 are staggered between adjacent sets. That is, the rollers of one set are not circumferentially aligned with the rollers of another set.

Each set of rollers 64 is disposed in a respective annular recess 66 formed in the inner surface of outer race 54. Consequently, rollers 64 are set into outer race 54 so as to prevent relative axial motion between rollers 64 and outer race 54. Conversely, rollers 64 are not set into inner race 58 so that relative axial motion between rollers 64 and inner race 58 is permitted. This arrangement accommodates the axial displacement of arbor 32 with respect to housing 22 that occurs when retention knob 44 is pulled into tapered hole 40 by the milling machine power draw bar apparatus to attach arbor 32 to spindle 42. That is, when arbor 32 is pulled into firm engagement with spindle 42, inner race 58 slides axially along rollers 64, allowing arbor 32 to move axially with respect to housing 22, which is secured directly to mill head 14. And when arbor 32 is subsequently released from engagement with spindle 42, inner race 58 slides along rollers 64 in the opposite axial direction.

Second bearing assembly 52, located adjacent to proximal end 26 of housing 22, includes an outer ring-shaped race 68 disposed in a second annular recess 70 formed in bore 24 and an inner ring-shaped race 72 fixed to the outer surface of arbor 32. Inner race 72 is held on arbor 32 against relative axial movement by a retainer ring 74 screwed onto threads 76 formed on the outer surface of arbor 32. A second cap ring 78 is attached to proximal end 26 of housing 22 by a number of bolts 80 so as to encircle arbor 32 and close off the open end of bore 24. Cap ring 78 supports a second shaft seal 82 which slidingly engages arbor 32 to seal the interior of housing 22 from influx of machining debris. A set of circumferentially spaced ball bearings 84 is disposed between outer and inner races 68 and 72. Inner race 72 includes an annular recess 86 that prevents any relative axial motion between ball bearings 84 and inner race 72, while outer race 68 includes an annular recess 88 that prevents relative axial motion between ball bearings 84 and outer race 68 in one axial direction (upward as viewed in FIG. 3) but permits relative axial motion between ball bearings 84 and outer race 68 in the other axial direction.

Outer race 68 is biased in that other axial direction (downward as viewed in FIG. 3) by a wave spring 90 and a spacer assembly 92. Spacer assembly 92 is slidingly disposed in a third annular recess 94 formed in bore 24, which is adjacent to and slightly deeper than second annular recess 70. Wave spring 90 is disposed between cap ring 78 and spacer assembly 92 in a compressed state so as to tend to push spacer assembly 92 away from cap ring 78. The other end of spacer assembly 92 abuts against outer race 68 so that the downward bias of wave spring 90 is transmitted to outer race 68. Thus, when arbor 32 is pulled into firm engagement with spindle 42 by the milling machine power draw bar apparatus, inner race 72 and ball bearings 84 are moved axially as well. The ball bearings 84 abut against the closed side of annular recess 88 and force outer race 68 upwards against the force of wave spring 90, thereby preloading second bearing assembly 52 to the proper value for smooth running. When arbor 32 is released from engagement with spindle 42, inner race 72 and ball bearings 84 move in the opposite (downward) axial direction. Outer race 68 is forced downward due to the force of wave spring 90. Accordingly, second bearing assembly 52 is able to accommodate the axial displacement of arbor 32 with respect to housing 22.

Spacer assembly 92 includes a first spacer 93 located next to outer race 68 and a second spacer 95 placed in contact with wave spring 90. This two piece arrangement facilitates construction of second bearing assembly 52. That is, during assembly, first spacer 93 is initially placed into position against outer race 68 before retainer ring 74 is secured to arbor 32. Then, after retainer ring 74 has been screwed onto threads 76, second spacer 95 is installed.

Because of the support provided by housing 22 and first and second bearing assemblies 50 and 52, spindle extension 12 can provide significantly greater extension than the prior art devices without experiencing tool instability. Specifically, cylindrical body portion 34 of arbor 32 (i.e., the length of arbor from drive flange 46 to tool 20) can be in the range of about 10–20 inches long.

As mentioned above, housing 22 is fixedly attached to mill head 14. While housing 22 can be directly attached to mill head 14, it is preferably attached via a base plate 96. As best seen in FIG. 2, base plate 96 has a central opening 98 to accommodate tapered shank 36 and is attached to the underside of mill head 14 by a number of bolts 100. Housing 22 is then attached to base plate 96 by additional bolts 102 that extend through mounting flange 30 and threadingly engage base plate 96. Base plate 96 compensates for the fact that the underside of a mill head is typically not square with respect to the longitudinal axis of the mill head's spindle. Specifically, the surface of base plate 96 that contacts mill head 14 can be machined so that when base plate 96 is attached to mill head 14, the other surface of base plate 96 is perpendicular to the spindle axis. Thus, a single spindle extension 12 can be easily interchanged between a number of milling machines by simply providing each milling machine with its own base plate.

The foregoing has described a spindle extension having a supported arbor so as to stabilize the cutting tool at extended distances from the spindle. While specific embodiments of the present invention have been described, it will be apparent to those skilled in the art that various modifications thereto can be made without departing from the spirit and scope of the invention as defined in the appended claims.

What is claimed is:

1. A spindle extension for a milling machine having a mill head and a spindle rotatively mounted in said mill head, said spindle extension comprising:

a housing attached to said mill head and having a bore formed therein;

an arbor rotatively mounted in said bore, said arbor including a substantially cylindrical body portion with an integral shank formed on one end and a means for attaching a tool provided on the other end; and at least one bearing assembly disposed between said arbor and said housing, wherein said bearing assembly permits displacement of said arbor relative to said housing along the longitudinal axis of said arbor.

2. The spindle extension of claim 1 comprising first and second bearing assemblies disposed between said arbor and said housing, both of said first and second bearing assemblies permitting displacement of said arbor relative to said housing along the longitudinal axis of said arbor.

3. The spindle extension of claim 2 wherein said first bearing assembly comprises an outer race fixed to said housing, an inner race fixed to said arbor, and a set of rollers disposed between said outer race and said inner race, said rollers being retained against relative axial movement with respect to said outer race but not with respect to said inner race.

4. The spindle extension of claim 3 further comprising a second set of rollers disposed between said outer race and said inner race, said second set of rollers being retained against relative axial movement with respect to said outer race but not with respect to said inner race.

5. The spindle extension of claim 2 wherein said second bearing assembly comprises an outer race slidably disposed in said housing, an inner race fixed to said arbor, a spring situated to bias said outer race towards one end of said housing, and a set of ball bearings disposed between said outer race and said inner race.

6. The spindle extension of claim 5 further comprising a spacer slidably disposed in said housing between said outer race and said spring.

7. The spindle extension of claim 1 wherein said substantially cylindrical body portion is greater than six inches long.

8. The spindle extension of claim 7 wherein said substantially cylindrical body portion is at least about ten inches long.

9. The spindle extension of claim 1 further comprising a base plate disposed between said housing and said mill head.

10. The spindle extension of claim 1 further comprising a cap ring attached to one end of said housing and a shaft seal supported by said cap ring and slidingly engaging said arbor.

11. The spindle extension of claim 10 further comprising a second cap ring attached to another end of said housing and a second shaft seal supported by said second cap ring and slidingly engaging said arbor.

12. The spindle extension of claim 1 wherein said shank is tapered.

13. The spindle extension of claim 1 further comprising at least one drive lug attached to said arbor adjacent to said means for attaching a tool.

* * * * *